United States Patent [19]

Langer

[11] Patent Number: 5,581,863
[45] Date of Patent: Dec. 10, 1996

[54] ELECTRONIC CONTROL DEVICE FOR INDIVIDUAL DRIVES OF MACHINING MACHINES AND PROCESS FOR CONTROLLING THE INDIVIDUAL DRIVES

[75] Inventor: Detlef Langer, Bergisch, Germany

[73] Assignee: Alfred H. Schutte GmbH & Co. KG, Germany

[21] Appl. No.: 397,424

[22] Filed: Mar. 1, 1995

[30] Foreign Application Priority Data

Mar. 17, 1994 [DE] Germany .................. 44 09 097.8

[51] Int. Cl.$^6$ .................................................. B23Q 5/02
[52] U.S. Cl. ....................... 29/38 R; 82/1.11; 82/129; 364/474.35; 409/80; 409/131; 451/5
[58] Field of Search .................. 29/27 R, 38 R, 29/38 A, 38 B; 409/131, 132, 80; 82/903, 1.11, 129, 133; 451/5; 364/474.22, 474.29, 474.37, 474.35, 474.11, 474.28, 474.33; 318/660

[56] References Cited

U.S. PATENT DOCUMENTS

| | | |
|---|---|---|
| 3,656,327 | 4/1972 | Kosem ............................. 82/1.11 |
| 3,858,053 | 12/1974 | Bureti ............................... 82/133 |
| 3,878,983 | 4/1975 | Hamill, III et al. ............ 364/474.22 |
| 3,918,045 | 11/1975 | Morser et al. ................... 318/660 X |
| 4,038,890 | 8/1977 | Winger ........................... 364/474.29 |
| 4,204,257 | 5/1980 | Hungerford .................... 364/474.37 |
| 4,319,122 | 3/1982 | Sieradzki ........................ 318/660 X |
| 4,364,110 | 12/1982 | Hyatt .............................. 364/474.22 |
| 5,153,490 | 10/1992 | Verall ............................. 364/474.35 |

*Primary Examiner*—William R. Briggs
*Attorney, Agent, or Firm*—Vickers, Daniels & Young

[57] ABSTRACT

An electronic control device for individual drives of machining machines, particularly of machine tools with a plurality of drive apparatuses, in which, according to the counting state of a pulse counter (35), path information elements associated with the latter are extracted simultaneously by a computer unit (37) from memories (41, 42, 43) associated with many drive apparatuses (18, 19, 20) and are converted into control values necessary for machining, which control values are then fed as set values to control circuits (30, 31, 32) for the drive apparatuses (18, 19, 20). The electronic control device (37) is supplied with a low counting pulse frequency ($f_z$) and can therefore process path and speed information values from a memory unit (36) for very many drives (18, 19, 20) simultaneously.

64 Claims, 3 Drawing Sheets

ELECTRONIC CONTROL DEVICE FOR INDIVIDUAL DRIVES OF MACHINING MACHINES AND PROCESS FOR CONTROLLING THE INDIVIDUAL DRIVES

BACKGROUND OF THE INVENTION

This invention relates to an electronic control device for the individual drives of machining machines, particularly of machine tools having a plurality of tool and/or workpiece drive apparatuses, for the machining of workpieces in machining cycles. The invention also relates to a process for controlling machining machines.

Machine tools having a plurality of machining stations and many workpiece and tool drives, such as multi-spindle automatic lathes, for example, have hitherto predominantly been controlled mechanically from a central control shaft via cams. A mechanical control system such as this operates reliably and rapidly, the control movements are easy to monitor and operation of the machine is simple. However, mechanical cam control systems can only be adapted to changed operating conditions in a manner which is very time-consuming, so that machines of this type are only suitable for machining workpieces for which large-scale manufacture is necessary. Resetting a mechanical cam control system is very time-consuming, is inconvenient for the operator, and results in high costs.

In order to avoid these disadvantages of mechanical cam control it is also already known that the tool drives can be provided with separate drive motors, the latter being controlled electronically according to a predetermined program. However, for this purpose it is necessary to assign a separate computer to each drive and to tune these computers to each other by means of a main computer. The expenditure required for this is considerable and the number of drives which can still be controlled simultaneously, even when very powerful computers are used, is restricted, since a very large amount of data has to be processed within a very short timescale.

SUMMARY OF THE INVENTION

The object of the present invention is therefore to provide an electronic control device for individual drives of the type described in detail at the outset and a process for controlling these individual drives, which operates very accurately at low cost, which can be reset rapidly and simply, and which when there is uninterrupted coupling of all the drives to each other operates very rapidly and just as reliably as a mechanical cam control system, and which is just as easy to monitor and can be operated as simply as the latter.

This object is achieved according to the invention by means of a counting pulse generator, a pulse counter and a memory unit having memories for each drive apparatus, and by means of a computer unit connected to the pulse counter and the memory unit, which computer unit scans the counter state at the pulse counter at equal time intervals and extracts the path information values assigned to the counter state each time from the memory unit at the scanning instant and converts them into the control values necessary for machining, which control values are fed as set values to a control circuit for the respective drive apparatus.

In this respect the counting pulse generator generates a definite number of counting pulses during each machining cycle, which are counted up by the pulse counter in the machining cycle. The memories contain a plurality of path information values for each drive apparatus; these path information values are selected according to the desired machining operation and are called up simultaneously for all drives according to the corresponding counting values.

This design has the advantage that a practically unlimited number of drives can be controlled using a single, central computer unit, since the central computer unit only has to process comparatively few information elements at each scanning instant, which are fed to it simultaneously for all drives from the memory unit.

The counting pulse generator advantageously consists of a frequency generator and a frequency converter, wherein the frequency generator can be a pulse generator driven by a main drive of the machining machine. The pulses generated by the frequency generator, the number of which pulses emitted per unit time is always constant, the "source frequency", are modulated by the frequency converter so that they match the running of the machine. For this purpose the frequency converter advantageously comprises a plurality of frequency dividers, which can be changed according to need by a frequency divider changing device controlled by the pulse counter. Alternatively, it is also possible for the frequency divider changing device to be controlled by a superordinate process control system, for example by a stored program system (SPS).

So as to be able to control all drive apparatuses simultaneously, the memory unit has at least as many memories as there are drive apparatuses to be controlled. Each memory then contains all the path information values of the drive apparatus associated with it for a machining cycle.

The computer unit advantageously consists of a set value computer, which extracts the path information values associated with the respective counting pulse from all memories at each scanning instant, and of a drive computer, which adds correction values to the set values, which result from the path information values, for controlling the drive apparatuses. In multi-spindle automatic lathes, for example, these correction values take into account spindle positioning errors and the action of heat and are combined as offset values with the path set values. Zero-point displacements and tool positions which are off-centre can also be taken into account with correction values such as these.

One particular advantage of the invention is that only a single drive computer is necessary for all drives. This computer provides the different path set values for all drives, which set values are fed to the control circuits for the individual drives and can then be amplified.

The invention also makes it possible for an electronic handwheel to be used, with which the drives can be slowly controlled manually as and when this is necessary when setting the machine. For this purpose the pulse counter may also be designed as a bidirectional counter, so that the machining machine can also be made to run backwards when setting is effected.

It is particularly advantageous if the number of counting pulses for the machining cycle is freely selectable and the number of path information values in the memories corresponds to the number of counting pulses of the pulse counter during a machining cycle. The number of path information elements available can then be optimally matched to the specific type of machining, so that smooth transitions can be achieved between varying drive speeds.

So that jumps in speed are avoided, it is advantageous if a speed information memory, which contains a limiting speed constant and a speed information element for each path information element, is associated at least with individual path information memories each time. The computer unit is then provided with an interpolator which calculates path information values from the extracted speed information values according to the counting pulse frequency of the pulse counter and according to a predetermined limiting speed, which path information values are linked in the drive computer with current path information values and are converted into intermediate control values for the control circuits of the drive apparatuses. The determination of intermediate values such as these is particularly advantageous when starting and stopping or when there is an abrupt change of movement, since it is then that particular consideration has to be given to the inertia of the masses in movement.

When controlling the individual drives according to the invention, a plurality of path information values for each drive apparatus is first stored in a memory unit in each case, corresponding to the desired machining operations. These path information values determine the transition between different speeds of the drive, the chronological breakdown of the stroke, the advance and return, and the stoppage of the tool or the workpiece along the respective working axis.

Thereafter a plurality of counting pulses is generated by a pulse counter during a machining cycle of the machining machine, and these counting pulses are counted up to a predetermined value corresponding to the machining operation. In this connection the counter state of the pulse counter and the path information values for the individual drive apparatuses corresponding to the respective counter state are scanned simultaneously, and the scanned path information values are converted into the control values which are necessary for machining. Thereafter these control values are fed as set values to the control circuits for the respective drive apparatuses.

If counting pulses are temporarily provided at a low frequency in the course of a machining cycle, it is possible that the same counting pulse may be found at successive scanning instants and that path information values may not be available at all scanning instants, since these path information values are only associated with defined counting pulses. If there are large alterations of speed, very large changes of path then arise between successive counting pulses, which cannot be implemented by the respective drive.

In order to provide compensation in this situation without increasing the counting pulse frequency, it is proposed according to the invention that the respective (current) counter state at the scanning instant is compared with the counter state of the preceding scanning instant, and a path information value associated with the current scanning instant is determined by multiplying the speed value taken from the memory at the preceding scanning instant by the scanning period, that the path information calculated in this manner is added to the path information taken from the memory and corresponding to the preceding scanning instant, and that a path information intermediate value is formed in this manner, when the counting pulse frequency falls below a predetermined minimum value and the speed value at the preceding scanning instant exceeds a predetermined limiting speed.

With the aid of the intermediate values obtained in this manner it is possible to smooth the flow of the control values and to prevent jumps in the movement of the drives.

The control system according to the invention is explained in more detail in the description given below and with reference to the drawings, which exemplify the control of a multi-spindle automatic lathe with three drives.

DESCRIPTION OF THE PREFERRED EMBODIMENTS

Figure 1:
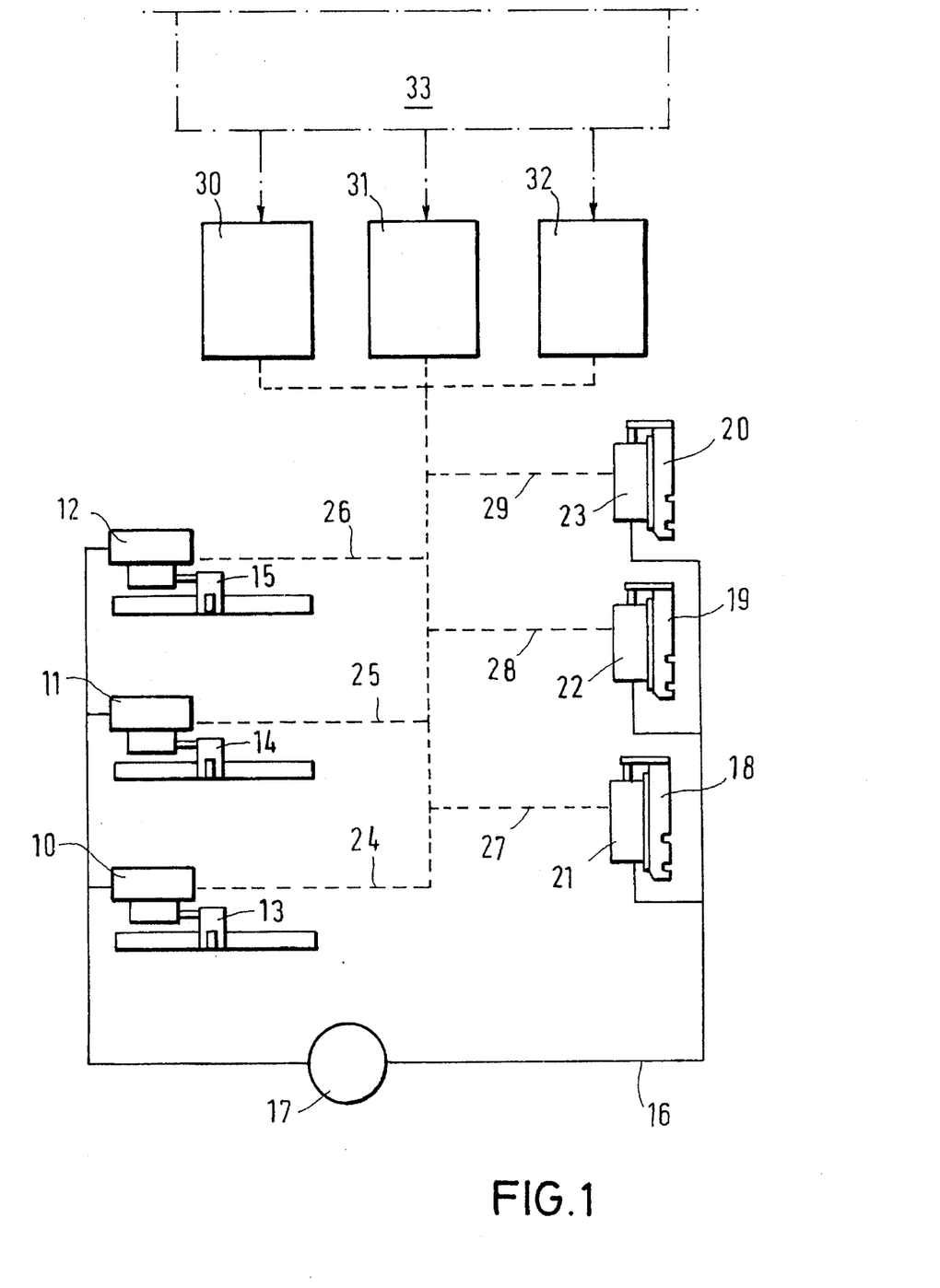
FIG. 1 is a schematic illustration of a machining machine having three workpiece drives and three tool drives and an electronic control system therefor.

In FIG. 1, three workpiece spindles of a multi-spindle automatic lathe are denoted by 10, 11 and 12. These spindles are only illustrated schematically in the drawing and are rotationally driven by workpiece drives 13, 14 and 15. The workpiece drives 13, 14 and 15 are connected via a power line 16 to a power source 17, to which the tool drives 18, 19 and 20 for three tool saddle slides 21, 22 and 23 are also connected.

Figure 2:
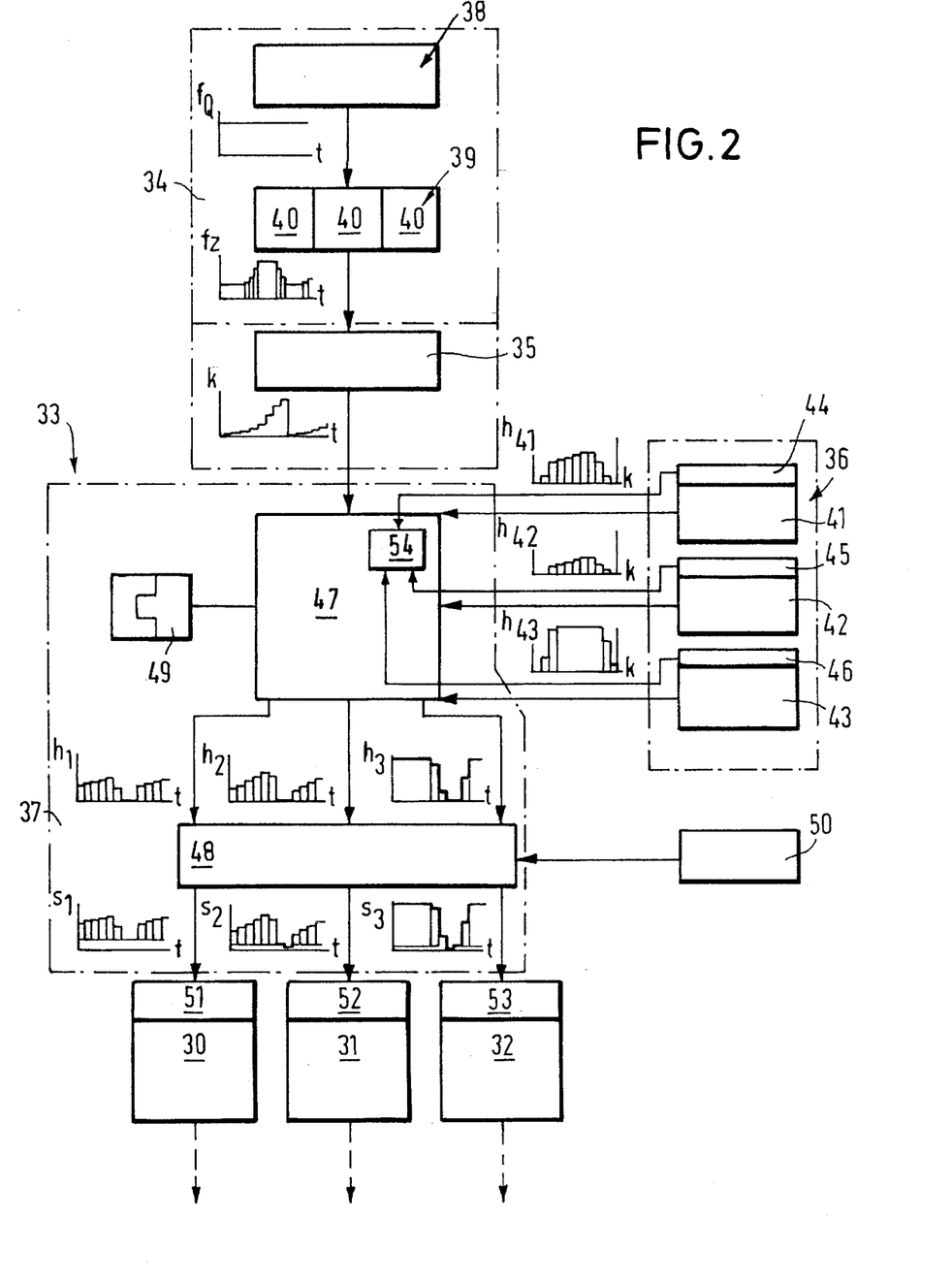
FIG. 2 is a block circuit diagram of the electronic control system for the three tool drives of the machine shown in FIG. 1.

The workpiece drives 13, 14 and 15 are connected to their control circuits via control lines 24, 25 and 26 and the tool drives 18, 19 and 20 are connected to their control circuits via control lines 27, 28 and 29. Only the control circuits 30, 31 and 32 for the tool drives 18, 19 and 20 are illustrated in FIGS. 1 and 2. However, it is clear that identical control circuits are also provided for the workpiece drives 13, 14 and 15.

The control circuits 30 to 32 of the tool drives 18 to 20 obtain their set values from an electronic control device which is the subject of the invention and which is illustrated schematically in detail in FIG. 2.

In the embodiment which is described and illustrated, the electronic control device 33 only serves to control the drives of workpieces and tools during machining cycles. It is part of the overall, electronic machine control system, which also includes a stored program system (SPS) by means of which the switching on and off of the main motor, the indexing of the spindle drums, the feeding, clamping and detachment of the workpiece rods in the workpiece spindles and other functions of the multi-spindle automatic lathe considered here are controlled. The SPS may also control individual units of the electronic control device described here, for example it may switch over the frequency divider changing device or may assign another source frequency to the frequency generator, as will be explained below.

The electronic control device 33 essentially consists of a counting pulse generator 34, a pulse counter 35, a memory unit 36 and a computer unit 37. The counting pulse generator 34 comprises a frequency generator 38 and a frequency converter 39. The frequency generator 38 generates pulses $f_Q$ of constant frequency, the so-called "source frequency". However, depending on the type of machining in the machine, these pulses may be selected so that they are different, and can be adjusted by the SPS, for example.

The frequency converter 39 contains one or more frequency dividers 40, by means of which the source frequency generated by the frequency generator 38 can be converted, during successive production times and nonproductive times in the course of a machining cycle, so that counting pulses of higher or lower frequency are supplied at the output of the counting pulse generator depending on the type of movement desired for a workpiece or tool in the rapid motion or working motion stages in the course of a machining cycle. By changing over the frequency divider, which can be effected by the above-mentioned SPS which is not illustrated here, not only is the desired frequency set for the working and rapid motion, but ramps are also possible between the different drive speeds, as is schematically illustrated in FIGS. 3 and 4.

Figure 3:
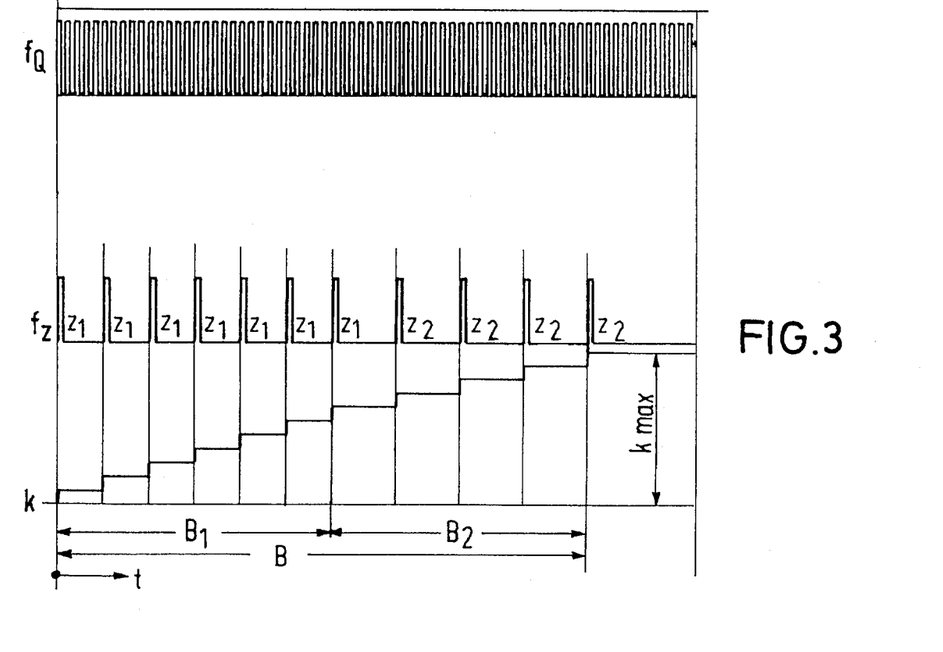
FIG. 3 illustrates the counting pulses of a machining cycle for the tool drives of the machine shown in FIG. 1.

The graph in the top part of FIG. 3 shows the source frequency $f_Q$ generated by the frequency generator 38. The graph in the bottom part of FIG. 3 shows the source frequency modulated by the frequency converter 39, namely the counting frequency $f_z$. In the example shown in FIG. 3, it can be seen that the counting frequency is subdivided during the machining cycle B into a first frequency range $B_1$ and a second frequency range $B_2$, wherein the counting pulses $Z_1$ in the first frequency range occur at a higher frequency than the counting pulses $Z_2$ in the second frequency range. In this respect the counting pulses $Z_1$ in the first frequency range are associated with the rapid motion of the saddle slide when the tool is advanced, and the counting pulses $Z_2$ in the second frequency range are associated with the slower working motion of the tool.

Figure 4:
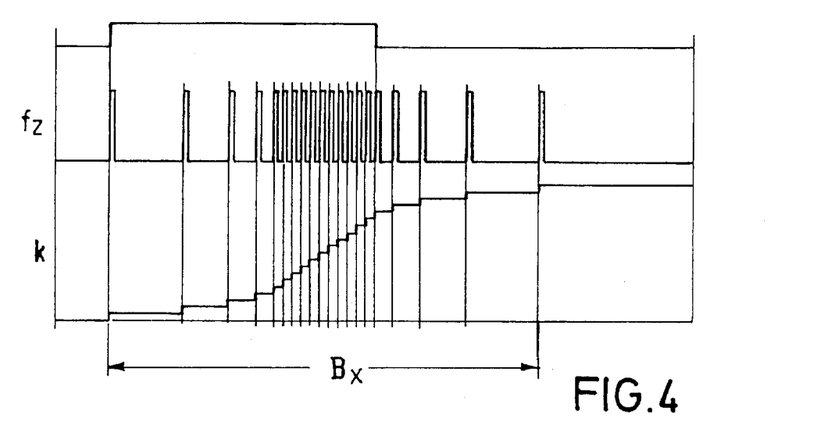
FIG. 4 illustrates a variant of the counting pulses in another machining cycle for the tool drives of the machine shown in FIG. 1.

FIG. 4 illustrates another frequency response characteristic, which is matched to the conditions of movement when starting and stopping a tool saddle slide. It can be seen that after switching on the drive the counting frequency becomes increasingly higher and falls by stages after switching off, so that it matches the running of the machine. In order to obtain a start/stop ramp such as this, it is advantageous to use a pulse generator driven by the main drive of the machining machine as the frequency generator.

The counting pulses Z generated in this manner by the frequency generator 38 are counted up to the greatest height $k_{max}$ during a machining cycle. Thereafter the pulse counter 35 is reset to zero and recommences counting up the counting pulses Z supplied by the counting pulse generator 34. Since the successive machining cycles B are always identical, it is advisable to effect the frequency changes during a machining cycle according to the counter state of the pulse counter 35. The pulse counter 35 then controls the frequency divider changing device in the frequency converter and simultaneously controls the rotational speed of the working and rapid motion stages, as well as the acceleration and braking when the drives are set in operation and stopped.

The memory unit 36 contains as many path information memories 41, 42, 43 as there are drives to be controlled. In the embodiment illustrated six drives are present, namely three workpiece drives 13, 14 and 15 and three tool drives 18, 19 and 20. For the sake of clarity, however, only three path information memories 41, 42, 43, which may be associated with the drives 18, 19 and 20 for the saddle slides 21, 22 and 23, are illustrated in FIG. 2. However, it is clear that additional path information memories may be provided, which could be associated with the drives 13, 14 and 15 of the workpiece spindles 10, 11 and 12, or with other drives for cross-slide rests or other machining units.

The path information memories 41, 42 and 43 contain the path information elements for the individual drives 18, 19 and 20 with which they are associated. These path information elements are freely programmable and determine the advance of the tool in the rapid motion stage, the apportioning of the tool stroke, the transitions between the individual strokes in the working motion stage and the return and stoppage of the tool on the axis concerned. The number of cells of each memory 41, 42, 43 is identical to the number $k_{max}$ of the pulses which the pulse counter counts up in a machining cycle B. The different path information elements $h_{41}$, $h_{42}$ and $h_{43}$, which are contained in the path information memories 41, 42 and 43 and which are associated with the individual counting pulses Z, are represented graphically near the memories.

A speed information memory 44; 45; 46, which contains a limiting speed constant and a speed information element v for each path information element h, forms part of each path information memory. Just like the path information memories, the speed information memories also contain a number of cells which is the same as the number of counting pulses Z supplied by the pulse counter 35 in each machining cycle B.

The computer unit 37 consists of a set value computer 47 and of a drive computer 48. The set value computer has a separate pulse generator 49, which generates scanning pulses t at a constant scanning frequency $t_f$, independently of the counting pulse generator 34.

The set value computer 47 is connected to the pulse counter 35 and to the memory unit 36 and scans the counter state k of the pulse counter 35 at identical time intervals (scanning period) with each of its scanning pulses t. At each scanning instant it simultaneously extracts the path information values h, which are assigned to the counter state k scanned in each case, from the path information memories 41, 42 and 43 and the memory unit 36 and converts them into the control values for the respective drive apparatus 18, 19 and 20 which are necessary for machining.

The drive computer 48, to which a correction value memory 50 is connected, is connected downstream of the set value computer 47. This correction value memory 50 contains correction values, for example for spindle positioning errors and the action of heat, for tool wear and zero point displacements, which are combined by the drive computer as offset amounts with the control values coming from the set value computer. The control values $s_1$, $s_2$ and $s_3$ which are modified in this manner are fed to the control circuits 30, 31 and 32 for the tool drives 18, 19 and 20 and are then amplified in amplifiers 51, 52 and 53.

It was mentioned above that one great advantage of the electronic control device according to the invention is that the computer unit for each drive only has to process comparatively few values per unit time, and therefore control values for very many drives can be made available simultaneously. However, this is only possible if the counting pulse frequency $f_z$ is not too high. However, in this respect it can happen that the same counter state of the pulse counter is scanned at two successive scanning instants and the path information elements of the individual path information memories which form part of this remain unchanged. If a large change in path, which is associated with a high speed of a drive apparatus, then corresponds to the next counter state in the following scanning instant, the drive cannot follow a control pulse such as this. In order to prevent jumps in speed such as this during operation, an interpolator 54 is provided in the computer unit 37 in the control device according to the invention. This interpolator 54 only operates when the counting pulse frequency $f_z$ falls below a predetermined limiting value, for example if it is significantly lower than the scanning frequency $f_t$ and if a predetermined, highest possible limiting speed of a drive is exceeded simultaneously.

As mentioned above, each speed memory 44, 45, 46 contains such a limiting speed constant and a speed information element for each path information element of the associated path information memory 41, 42, 43.

If the above-mentioned, fixed limiting values are not adhered to, the interpolator 54 compares the state of the pulse counter 35 at the scanning instant with the counter state at the preceding scanning instant. If the counter state is the same at both scanning instants, the interpolator extracts the speed information of the preceding scanning instant from the corresponding speed information memory 44; 45; 46 and calculates a virtual path information value therefrom by multiplying it by the scanning period. It then adds this virtual path information value to the path information at the preceding scanning instant. This results in a path information intermediate value, which then, optionally with further subsequent path information intermediate values, performs a ramp function.

It can be recognised that the calculation operations to be performed by the interpolator hardly imposes a load on the computer unit 37, since they only occur during the machining period and only seldom arise during machining.

The invention is not restricted to the embodiment which has been described and illustrated. Rather, numerous alterations and additions are possible without departing from the scope of the invention. For example, the electronic control device which has been described and illustrated can be used not only for multi-spindle automatic lathes, but can also be used for other machining machines, such as milling, grinding and slotting machines, which have a plurality of drives. Moreover it is possible for even more memories to be associated with the computer unit, and for the advance, clamping and release of the workpieces also to be controlled by the electronic control device.

I claim:

1. An electronic control device for individual drives of machining machines, particularly of machine tools with a plurality of tool and/or workpiece drive apparatuses, for the machining of workpieces in machining cycles, characterised by
    a counting pulse generator (34) which generates a definite number of counting pulses (Z) during each machining cycle (B);
    a pulse counter (35);
    a memory unit (36) having memories (41–43) which contain a plurality of path information values (h) for each drive apparatus (13, 14, 15, 18, 19, 20); and
    a computer unit (37) which is connected to the pulse counter (35) and to the memory unit (36), and which scans the counter state (k) at the pulse counter (35) at equal time intervals (scanning period) and extracts the path information values (h) assigned to the counter state (k) from the memory unit (36) at the scanning instant each time and converts them into control values (s) necessary for machining, which control values are fed as set values to a control circuit (30, 31, 32) for the respective drive apparatus (18, 19, 20).

2. A control device according to claim 1, characterised in that the counting pulse generator (34) comprises a frequency generator (38) and a frequency converter (39).

3. A control device according to claim 2, characterised in that the frequency generator is a pulse generator driven by a main drive of the machining machine.

4. A control device according to claim 2, characterised in that the frequency converter (39) comprises a plurality of frequency dividers (40).

5. A control device according to claim 4, characterised in that the memory unit (36) has at least as many memories (41 to 43) as there are drive apparatuses (18–20) to be controlled.

6. A control device according to claim 1, characterised in that the computer unit (37) comprises a set value computer (47) and a drive computer (48), wherein the drive computer (48) adds correction values to the set values (s) for the drive apparatuses (18–20).

7. A control device according to claim 2, characterized in that the computer unit (37) comprises an interpolator (54) which calculates path information values (h) from the extracted speed information values (v) according to the counting pulse frequency (fz) of the pulse counter (35) and according to a predetermined limiting speed, which path information values are linked in the drive computer (48) with current path information values (h) and are converted into intermediate control values for the control circuits (30–32) of the drive apparatuses (18–20).

8. A control device according to claim 1, characterised in that the pulse counter (35) is a bidirectional counter.

9. A control device according to claim 2, characterised in that the frequency generator (38) generates a source frequency ($f_O$) which is constant but which can be varied by means of an adjusting device.

10. A control device according to claim 2, characterised in that the frequency converter (39) comprises a plurality of frequency dividers (40), and a frequency divider changing device which is controlled by the pulse counter (35).

11. A control device according to claim 1, characterised in that the number of counting pulses (Z) is freely selectable and the number of path information values (h) in the memories (41–43) corresponds at least to the number of counting pulses of the pulse counter (35) during a machining cycle (B).

12. A control device according to claim 1, characterised in that a speed information memory (44–46), which contains a limiting speed constant and a speed information element (v) for each path information element (h), is associated at least with individual path information memories (41–43) in each case.

13. A control device according to claim 1, characterised in that the computer unit (37) comprises an interpolator (54) which calculates path information values (h) from the extracted speed information values (v) according to the counting pulse frequency ($f_z$) of the pulse counter (35) and according to a predetermined limiting speed, which path information values are linked in the drive computer (48) with current path information values (h) and are converted into intermediate control values for the control circuits (30–32) of the drive apparatuses (18–20).

14. A process for controlling the individual drives of machining machines, particularly of machine tools having a plurality of tool and/or workpiece drive apparatuses, characterised by the following process steps:
    a) storing a plurality of path information values (h) for each drive apparatus (18–20) in a memory unit (36);
    b) generating a plurality of counting pulses ($Z_1$, $Z_2$ . . . $Z_{max}$) during a machining cycle (B) of the machining machine and counting the counting pulses (Z) generated, using a pulse counter (35);
    c) scanning the counter state (k) of the pulse counter (35) at equal time intervals and simultaneously scanning the path information values (h) for the individual drive apparatuses (18–20) which are associated with the respective counter state (k);
    d) converting the scanned path information values (h) into control values (s) which are necessary for machining; and e) feeding the control values as set values to control circuits (30–32) for the respective drive apparatuses (18–20).

15. A process according to claim 14, characterised by the following process steps:

f) comparing the respective (current) counter state at the scanning instant with the counter state of the preceding scanning instant, and g) calculating a path information value associated with the current scanning instant by multiplying the speed value taken from the memory at the preceding scanning instant by the scanning period, adding the calculated path information to the path information taken from the memory and corresponding to the preceding scanning instant in order to form a path information intermediate value, when the counting pulse frequency falls below a predetermined minimum value and the speed value at the preceding scanning instant exceeds a predetermined limiting speed.

16. A control device according to claim 2, characterized in that the frequency generator is a pulse generator driven by a main drive of the machining machine.

17. A control device according to claim 2, characterized in that the frequency converter (39) comprises a plurality of frequency dividers (40).

18. A control device according to claim 2, characterized in that the computer unit (37) comprises an interpolator (54) which calculates path information values (h) from the extracted speed information values (v) according to the counting pulse frequency (fz) of the pulse counter (35) and according to a predetermined limiting speed, which path information values are linked in the drive computer (48) with current path information values (h) and are converted into intermediate control values for the control circuits (30–32) of the drive apparatuses (18–20).

19. A control device according to claim 4, characterized in that the computer unit (37) comprises an interpolator (54) which calculates path information values (h) from the extracted speed information values (v) according to the counting pulse frequency (fz) of the pulse counter (35) and according to a predetermined limiting speed, which path information values are linked in the drive computer (48) with current path information values (h) and are converted into intermediate control values for the control circuits (30–32) of the drive apparatuses (18–20).

20. A control device according to claim 3, characterized in that the frequency converter (39) comprises a plurality of frequency dividers (40).

21. A control device according to claim 5, characterized in that the computer unit (37) comprises an interpolator (54) which calculates path information values (h) from the extracted speed information values (v) according to the counting pulse frequency (fz) of the pulse counter (35) and according to a predetermined limiting speed, which path information values are linked in the drive computer (48) with current path information values (h) and are converted into intermediate control values for the control circuits (30–32) of the drive apparatuses (18–20).

22. A control device according to claim 6, characterized in that the computer unit (37) comprises an interpolator (54) which calculates path information values (h) from the extracted speed information values (v) according to the counting pulse frequency (fz) of the pulse counter (35) and according to a predetermined limiting speed, which path information values are linked in the drive computer (48) with current path information values (h) and are converted into intermediate control values for the control circuits (30–32) of the drive apparatuses (18–20).

23. A control device according to claim 2, characterized in that the computer unit (37) comprises a set value computer (47) and a drive computer (48), wherein the drive computer (48) adds correction values to the set values (s) for the drive apparatuses (18–20).

24. A control device according to claim 3, characterized in that the computer unit (37) comprises a set value computer (47) and a drive computer (48), wherein the drive computer (48) adds correction values to the set values (s) for the drive apparatuses (18–20).

25. A control device according to claim 4, characterized in that the computer unit (37) comprises a set value computer (47) and a drive computer (48), wherein the drive computer (48) adds correction values to the set values (s) for the drive apparatuses (18–20).

26. A control device according to claim 5, characterized in that the computer unit (37) comprises a set value computer (47) and a drive computer (48), wherein the drive computer (48) adds correction values to the set values (s) for the drive apparatuses (18–20).

27. A control device according to claim 8, characterized in that the computer unit (37) comprises an interpolator (54) which calculates path information values (h) from the extracted speed information values (v) according to the counting pulse frequency (fz) of the pulse counter (35) and according to a predetermined limiting speed, which path information values are linked in the drive computer (48) with current path information values (h) and are converted into intermediate control values for the control circuits (30–32) of the drive apparatuses (18–20).

28. A control device according to claim 9, characterized in that the computer unit (37) comprises an interpolator (54) which calculates path information values (h) from the extracted speed information values (v) according to the counting pulse frequency (fz) of the pulse counter (35) and according to a predetermined limiting speed, which path information values are linked in the drive computer (48) with current path information values (h) and are converted into intermediate control values for the control circuits (30–32) of the drive apparatuses (18–20).

29. A control device according to claim 10, characterized in that the computer unit (37) comprises an interpolator (54) which calculates path information values (h) from the extracted speed information values (v) according to the counting pulse frequency (fz) of the pulse counter (35) and according to a predetermined limiting speed, which path information values are linked in the drive computer (48) with current path information values (h) and are converted into intermediate control values for the control circuits (30–32) of the drive apparatuses (18–20).

30. A control device according to claim 11, characterized in that the computer unit (37) comprises an interpolator (54) which calculates path information values (h) from the extracted speed information values (v) according to the counting pulse frequency (fz) of the pulse counter (35) and according to a predetermined limiting speed, which path information values are linked in the drive computer (48) with current path information values (h) and are converted into intermediate control values for the control circuits (30–32) of the drive apparatuses (18–20).

31. A control device according to claim 2, characterized in that the pulse counter (35) is a bidirectional counter.

32. A control device according to claim 3, characterized in that the pulse counter (35) is a bidirectional counter.

33. A control device according to claim 4 characterized in that the pulse counter (35) is a bidirectional counter.

34. A control device according to claim 5, characterized in that the pulse counter (35) is a bidirectional counter.

35. A control device according to claim 6, characterized in that the pulse counter (35) is a bidirectional counter.

36. A control device according to claim 12, characterized in that the computer unit (37) comprises an interpolator (54) which calculates path information values (h) from the extracted speed information values (v) according to the counting pulse frequency (fz) of the pulse counter (35) and according to a predetermined limiting speed, which path information values are linked in the drive computer (48) with current path information values (h) and are converted into intermediate control values for the control circuits (30–32) of the drive apparatuses (18–20).

37. A control device according to claim 2, characterized in that the frequency generator (38) generates a source frequency (fq) which is constant but which can be varied by means of an adjusting device.

38. A control device according to claim 3, characterized in that the frequency generator (38) generates a source frequency (fq) which is constant but which can be varied by means of an adjusting device.

39. A control device according to claim 6, characterized in that a speed information memory (44–46), which contains a limiting speed constant and a speed information element (v) for each path information element (h), is associated at least with individual path information memories (41–43) in each case.

40. A control device according to claim 8, characterized in that a speed information memory (44–46), which contains a limiting speed constant and a speed information element (v) for each path information element (h), is associated at least with individual path information memories (41–43) in each case.

41. A control device according to claim 9, characterized in that a speed information memory (44–46), which contains a limiting speed constant and a speed information element (v) for each path information element (h), is associated at least with individual path information memories (41–43) in each case.

42. A control device according to claim 10, characterized in that a speed information memory (44–46), which contains a limiting speed constant and a speed information element (v) for each path information element (h), is associated at least with individual path information memories (41–43) in each case.

43. A control device according to claim 11, characterized in that a speed information memory (44–46), which contains a limiting speed constant and a speed information element (v) for each path information element (h), is associated at least with individual path information memories (41–43) in each case.

44. A control device according to claim 2, characterized in that the frequency converter (329) comprises a plurality of frequency dividers (40), and a frequency divider changing device which is controlled by the pulse counter (35).

45. A control device according to claim 3, characterized in that the frequency converter (329) comprises a plurality of frequency dividers (40), and a frequency divider changing device which is controlled by the pulse counter (35).

46. A control device according to claim 4, characterized in that the frequency converter (329) comprises a plurality of frequency dividers (40), and a frequency divider changing device which is controlled by the pulse counter (35).

47. A control device according to claim 5, characterized in that the frequency converter (329) comprises a plurality of frequency dividers (40), and a frequency divider changing device which is controlled by the pulse counter (35).

48. A control device according to claim 6, characterized in that the frequency converter (329) comprises a plurality of frequency dividers (40), and a frequency divider changing device which is controlled by the pulse counter (35).

49. A control device according to claim 8, characterized in that the frequency converter (329) comprises a plurality of frequency dividers (40), and a frequency divider changing device which is controlled by the pulse counter (35).

50. A control device according to claim 9, characterized in that the frequency converter (329) comprises a plurality of frequency dividers (40), and a frequency divider changing device which is controlled by the pulse counter (35).

51. A control device according to claim 10, characterized in that the frequency converter (329) comprises a plurality of frequency dividers (40), and a frequency divider changing device which is controlled by the pulse counter (35).

52. A control device according to claim 2, characterized in that the number of counting pulses (Z) is freely selectable and the number of path information values (h) in the memories (41–43) corresponds at least to the number of counting pulses of the pulse counter (35) during a machining cycle (B).

53. A control device according to claim 3, characterized in that the number of counting pulses (Z) is freely selectable and the number of path information values (h) in the memories (41–43) corresponds at least to the number of counting pulses of the pulse counter (35) during a machining cycle (B).

54. A control device according to claim 4, characterized in that the number of counting pulses (Z) is freely selectable and the number of path information values (h) in the memories (41–43) corresponds at least to the number of counting pulses of the pulse counter (35) during a machining cycle (B).

55. A control device according to claim 5, characterized in that the number of counting pulses (Z) is freely selectable and the number of path information values (h) in the memories (41–43) corresponds at least to the number of counting pulses of the pulse counter (35) during a machining cycle (B).

56. A control device according to claim 6, characterized in that the number of counting pulses (Z) is freely selectable and the number of path information values (h) in the memories (41–43) corresponds at least to the number of counting pulses of the pulse counter (35) during a machining cycle (B).

57. A control device according to claim 8, characterized in that the number of counting pulses (Z) is freely selectable and the number of path information values (h) in the memories (41–43) corresponds at least to the number of counting pulses of the pulse counter (35) during a machining cycle (B).

58. A control device according to claim 9, characterized in that the number of counting pulses (Z) is freely selectable and the number of path information values (h) in the memories (41–43) corresponds at least to the number of counting pulses of the pulse counter (35) during a machining cycle (B).

59. A control device according to claim 10, characterized in that the number of counting pulses (Z) is freely selectable and the number of path information values (h) in the memories (41–43) corresponds at least to the number of counting pulses of the pulse counter (35) during a machining cycle (B).

60. A control device according to claim 11, characterized in that the number of counting pulses (Z) is freely selectable and the number of path information values (h) in the memories (41–43) corresponds at least to the number of counting pulses of the pulse counter (35) during a machining cycle (B).

61. A control device according to claim 2, characterized in that a speed information memory (44–46), which contains a limiting speed constant and a speed information element (v) for each path information element (h), is associated at least with individual path information memories (41–43) in each case.

62. A control device according to claim 3, characterized in that a speed information memory (44–46), which contains a limiting speed constant and a speed information element (v) for each path information element (h), is associated at least with individual path information memories (41–43) in each case.

63. A control device according to claim 4, characterized in that a speed information memory (44–46), which contains a limiting speed constant and a speed information element (v) for each path information element (h), is associated at least with individual path information memories (41–43) in each case.

64. A control device according to claim 5, characterized in that a speed information memory (44–46), which contains a limiting speed constant and a speed information element (v) for each path information element (h), is associated at least with individual path information memories (41–43) in each case.

* * * * *